May 1, 1945.
A. KLAMMT ET AL
2,375,113
METHOD OF APPLYING FINISHES TO THE SURFACES
OF WOOD OR OTHER POROUS MATERIALS
Filed Jan. 21, 1942
2 Sheets-Sheet 1
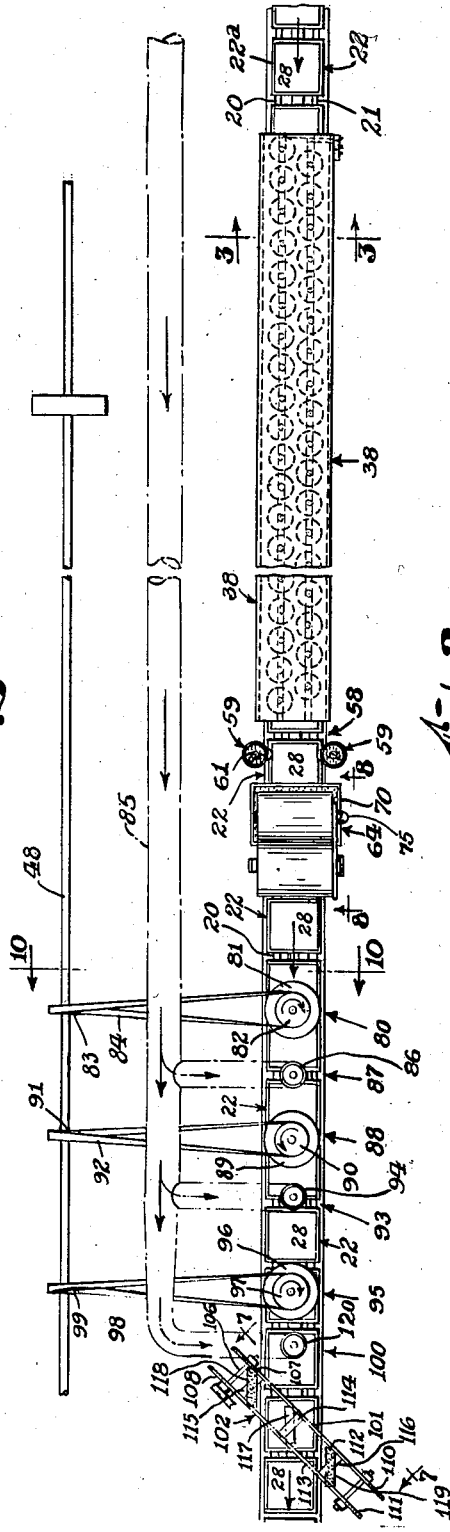
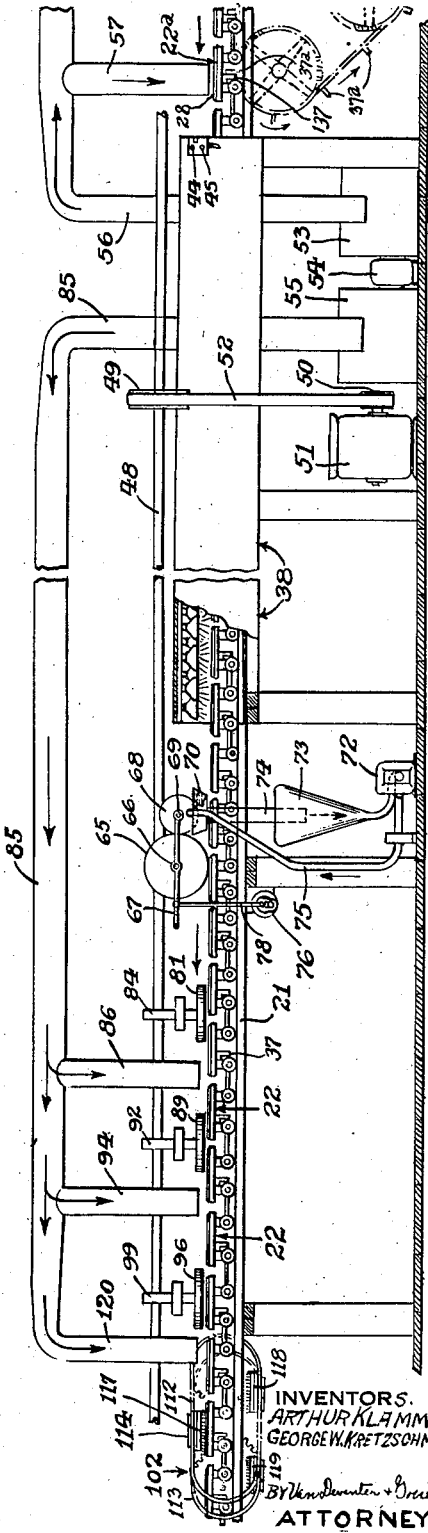
INVENTORS.
ARTHUR KLAMMT
GEORGE W. KRETZSCHMAR
BY Van Deventer + Greer
ATTORNEYS

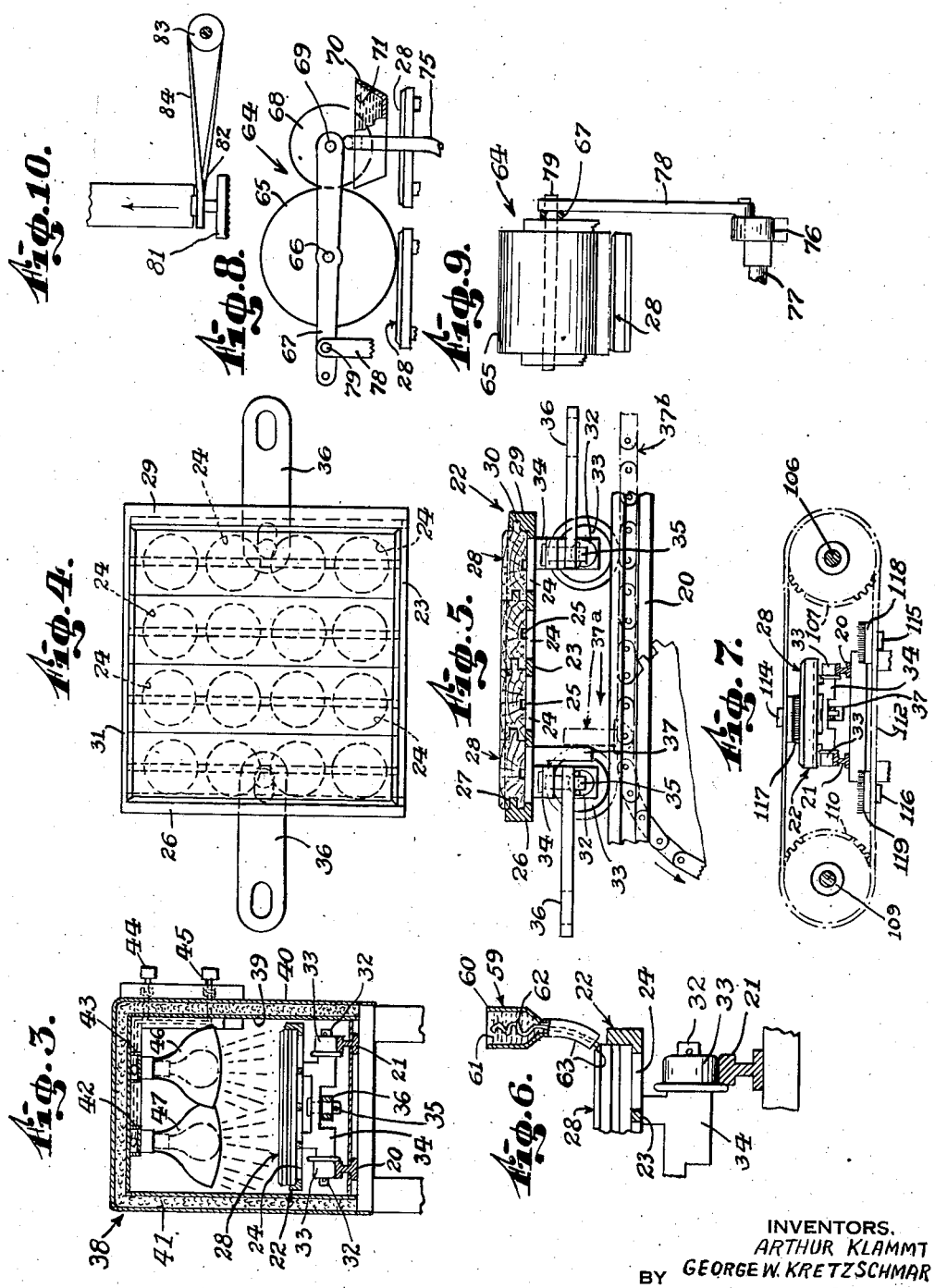

Patented May 1, 1945

2,375,113

UNITED STATES PATENT OFFICE 2,375,113

METHOD OF APPLYING FINISHES TO THE SURFACES OF WOOD OR OTHER POROUS MATERIALS

Arthur Klammt, New York, N. Y., and George W. Kretzschmar, Garfield, N. J., assignors to W. M. Ritter Lumber Company, a corporation of West Virginia Application January 21, 1942, Serial No. 427,590

4 Claims. (Cl. 117—57)

This invention relates to improvements in method of applying finishes to the surfaces of wood and other porous materials, and has for a principal object a system of finishing materials which includes the step of deeply heating the surface of the material to be finished, thereby causing the air within the pores of the material to expand and the greater part thereof to be driven off; a second step of applying the finish to said heated surface and spreading the same thereover; and, thirdly, the step of immediately cooling said material, thereby causing the rarified air remaining in the pores to contract, and thereby permitting the pressure in the atmosphere to force the applied finish deeply into the pores of the material.

There are many different types of finishes adapted to be applied to the surfaces of wood and other porous materials. Some of these finishes are on a vegetable base, some are on a mineral base, and others are on a synthetic base. We have obtained excellent results with tung oil, dehydrated castor oil, refined linseed oil, and "Bakelite" and other synthetic varnishes.

Another object of the invention is the provision of apparatus for moving the material to be finished along a track and positioning on or about said material as it passes along on said track a series of stations for performing operations sequentially upon the material as it passes along on said track, one of said stations comprising a tunnel including infra-red lamps for deeply heating the surface of said material and causing the air in the pores of the material to expand and a part of the same to be driven off, and others of said stations including means for applying a finish to the heated surface of said material and for spreading the same thereover, and for applying a blast of cool air to said surface and causing the air remaining in the pores of said material to contract and thereby pull the finish deeply into the pores of the material.

A further object of the invention is to provision of a system of finishing the surfaces of flooring and other wood materials which includes the steps of subjecting the surface of said material to the action of infra-red lamps for heating the surface of the material and the body of the material a substantial distance below said surface, causing the air within the pores of said material to expand and the greater part thereof to be driven off, and the steps of coating said surfaces with the liquid finish and cooling the same to utilize the partial vacuum created by said cooling for drawing the liquid into the pores of said material. This method effects a closer bond, than has heretofore been obtainable, between the finishing material and the wood, and therefore produces a more durable finished product.

Other objects and advantages of the invention will be apparent to those skilled in the art upon a perusal of this specification.

Referring to the drawings:

Figure 1 is a diagrammatic plan view of one example of apparatus for practicing our invention;

Figure 2 is an elevation of the apparatus shown in Figure 1;

Figure 3 is a sectional elevation of the lamp tunnel taken along the lines 3—3 of Figure 1;

Figure 4 is a plan view of one of the trucks for conveying the flooring material to be treated along the trackway;

Figure 5 is a vertical section of the truck shown in Figure 4, showing the same positioned on the rails of the trackway;

Figure 6 is a diagrammatic sketch showing means for applying the finishing fluid to the beveled edges of the parquet flooring blocks;

Figure 7 is an elevation of the arrangement for brushing the surfaces of the parquet flooring blocks after they leave the rotary spreading and polishing members; this view is taken along the lines 7—7 of Figure 1;

Figure 8 is an enlarged elevation of the finish-applying means as seen along the lines 8—8 of Figure 1;

Figure 9 is an elevation of the mechanism of Figure 8 as seen in a plane at right angles thereto; and Figure 10 is a cross sectional view, taken along the lines 10—10 of Figure 1, and showing one of the material spreaders.

Referring to Figures 1 and 2, a trackway which includes T rails 20 and 21 forms a path along which a plurality of trucks, generally designated by the numeral 22, is moved.

Turning for a moment to Figures 3, 4, and 5, each of these trucks consists of a bed plate 23 having a plurality of holes 24 formed therein. These holes are of such number and so positioned with respect to each other that they form parallel rows beneath the grooves 25 formed in the parquet flooring, thereby permitting the air to gain access to the bottom of the flooring within equally distributed areas.

At one end of the bed plate 23 is a straight flange member 26 which carries an inwardly projecting tongue 27 which engages the end groove of the parquet flooring block 28. At the opposite end of the bed plate 23 an upstanding flange 29 has a slot 30 formed therein which engages the external tongue of the parquet flooring 28, thereby the block is held in the truck.

Referring to Figure 4, the front or bottom edge of the bed plate 23 is open so that flooring blocks may be pushed into engagement with the tongue 27 and the slot 30 and pushed into position thereon. At the rear (or top) edge an upstanding L-shaped member 31 engages the transverse groove in the parquet flooring block, therefore the members 26, 29 and 31 rigidly hold the flooring block in position on the truck.

Cross members 34 secured to the lower surface of the bed plate 23 include stub shafts 32 which carry flanged wheels 33. Between the cross members 34 of each member are downwardly projecting studs 35 to which coupling members 36 are secured for coupling the trucks together to form a train.

Suitable means is provided for moving the trucks 22 along the track at a definite rate of speed. Each truck is provided with a downwardly projecting web 37, and the driving means between the rails (see lug 37a) may successively engage these webs.

Embracing the track is a tunnel, generally designated by the numeral 38 and which is shown more in detail in Figure 3. This tunnel may consist of an inner metallic wall 39 of generally rectangular cross section, and a second outer wall 40 also of generally rectangular cross section. These walls are spaced apart from each other and the space 41 therebetween may be filled with suitable insulation. Conduits 42 and 43 are mounted on top of the tunnel 38 and nipples and fittings connected thereto extend into the interior of the tunnel, as shown in Figure 3. The fittings are respectively designated by the numerals 44 and 45 and include sockets for the infra-red lamps 46 and 47.

Although the two fittings and sockets are described, it will be understood that the tunnel may contain a large number of these infra-red lamps, the number depending upon the length of the tunnel, the time the material takes to traverse the tunnel by the desired depth of the penetration of the heat.

In order to take care of different grades of material, switches may be provided for controlling the infra-red lamps, so that the operator may place any desired number in operation in any desired arrangement, in accordance with the results desired and the nature of the wood or the like being treated.

The trucks move in the direction of the arrows, and a loading zone may precede the trucks designated by the numeral 22a, so that each truck as it enters the tunnel 38 carries a flooring block to be finished.

A main shaft 48 drives the means for moving the trucks along the track-way and also drives other apparatus to be presently described. This shaft may carry a pulley 49 which is connected in driven relation to a pulley 50 on the driving motor 51 by means of a belt 52. A blower 53 may be directly connected to a driving motor 54, and a second blower 55 may also be connected to said motor, thereby providing a twin air supply.

A pipe 56 leads from the blower 53, and a branch pipe 57 connected thereto is encountered by the trucks when they reach the position 22a on the track-way, and air from the pipe 57 blows away all dust, small shavings, etc., from the surface of the flooring block.

After leaving the position 22a and moving to the left, as viewed in Figures 1 and 2, the trucks enter the tunnel 38, where they are subjected to the heat of the infra-red lamps, and this heat penetrates a substantial distance into the material, thereby causing the air within the pores of the wood to expand. It has been found that a greater portion of this heated air is driven off and the remainder of the air is in expanded and rarefied form.

As the trucks leave the tunnel, they traverse the zone designated by the numeral 58, wherein the beveled edges of the flooring are coated with finishing material.

The device 59 for applying the finish to said beveled edges is shown in detail in Figure 6, wherein a container 60 carries a body 61 of the fluid and a wick 62 bears on the beveled edge 63 of the wood and coats the beveled surface thereof as the block passes by said wick. The device 59 is stationary and the wick amply feeds a sufficient supply of the finish to thoroughly coat the beveled edge as the truck, upon which the block is carried, moves slowly by. One of these devices coats one beveled edge of the block, and the other of the devices coats the opposite beveled edge of the block. These are the edges which are parallel to the path of movement of the work.

In respect to the beveled edges transverse to the path of movement, the apparatus for treating the flat surfaces also takes care of these transverse bevels.

After leaving the zone 58, the trucks traverse a zone designated by the numeral 64 wherein finish is applied to the surfaces of the flooring blocks. The apparatus for applying the finish to said surfaces is illustrated diagrammatically in Figures 8 and 9, wherein a roller 65 has a shaft 66 journalled in opposite sides of a frame member 67. A roller 68 has its shaft 69 also journalled in said frame. The roller 68 extends into a trough 70 in which a finishing liquid is maintained at a predetermined level 71.

Referring to Figure 2, the level of the finishing fluid is maintained, and fresh fluid is continuously supplied to said trough by means of a circular pump 72. The inlet of the pump 72 may have a funnel-shaped conduit 73 connected thereto.

An overflow pipe 74 leads finishing fluid from the trough 70 to the funnel 73. A pipe 75 is connected to the outlet of the pump and delivers the fluid to the trough 70, thereby insuring a constant level in said trough of fresh fluid.

The roller 68 may be driven from the main shaft 48, and as it rotates, the finishing fluid on the surface of this roller is transmitted by contact to the surface of the roller 65, and obviously if the roller 65 is brought into contact with the surface of the flooring blocks, said surface will receive the coating fluid. However, to take care of the spaces between the flooring block on the one truck and the flooring block on the succeeding truck, the roller 65 is lowered on to the flooring blocks during the time they are beneath the roller and is raised up during the spaces between the block on one truck and the one on the succeeding truck.

This may be effected by means of a cam 76 carried on the shaft 77, which may be driven from the main shaft 48. Engaging the cam 76 is a push-rod 78 which is pivotally connected to the frame 67 at 79. The contour of the cam 76 and its speed of rotation are such that the roller 65 is lowered in contact with the flooring block as long as the block is traversing the vertical center line of the roller, and as soon as the block leaves said center line the roller is raised and held in such relation until the succeeding flooring block reaches the vertical center line of the roller. At this point, the roller is again lowered and the process is repeated. (See Fig. 9.)

The trucks leaving the zone 64 encounter a zone designated by the numeral 80 (Figures 1 and 2) where the flooring block is engaged by a rotary device for spreading the finish over the entire surface of the flooring block. This rotary spreader may consist of a disc 81 carrying a pulley 82 which is belted to a pulley 83 on the shaft 48 by means of a crossed belt 84, the direction of rotation being clockwise, as viewed from above in Figure 1. The lower surface of the disc 81 may be coated with a suitable material for spreading the finish over the entire surface of the block.

The blower 55 has its outlet connected to a pipe 85 for leading the air to points of use. A branch pipe 86 connected to the pipe 85 discharges air in a zone designated by the numeral 87.

As soon as the flooring blocks leave the zone 80, and are passing into the zone 87, they encounter the comparatively cool air being discharged from the pipe 86. This cool air causes the more or less rarefied air remaining in the pores of the material to contract, and thereby the partial vacuum created within the pores, and the atmospheric pressure from without, forces the finishing fluid into the pores of the wood a substantial distance depending upon the amount of heating and the depth of penetration of the heating.

As the blocks leave the zone 87, they enter the zone 88 and encounter a second rotary device for spreading the finish from the surface thereof and partially polishing the same. This rotary device may consist of a disc 89 carrying a pulley 90 which is belted to a pulley 91 on the main shaft 48 by means of a belt 92. This belt is not crossed, and therefore the disc 89 rotates in a counterclockwise direction, as viewed from above in Figure 1.

As the blocks leave the zone 88, they enter a zone 93 wherein the surface is subjected to further cooling by air passing from the pipe 85 via the branch pipe 94.

Upon leaving the zone 93, the blocks enter the zone 95 where they encounter a third rotary device, which may consist of a disc 96 carrying a pulley 97 which is belted by means of a cross belt 98 to a pulley 99 carried on the main shaft 48. Since the belt 98 is crossed, the disc 96 will rotate in the clockwise direction as viewed from above in Figure 1.

The flooring blocks leaving the zone 95, next pass into zone 100, where they are subjected to cold air from the branch 120 which is connected to the pipe 85.

As the blocks leave the zone 100, they pass into a zone 101 where they are subjected to the action of a series of brushes whose movement is so related to the movement of the trucks along said track-way that the resultant rubbing action of the brushes is substantially at right angles to the path of movement of the trucks, and the flooring blocks carried thereby.

The brushing device, generally designated by the numeral 102, is angularly disposed with respect to the path of travel of said trucks, and the movement of the brushes is so timed that, as stated above, the path of the brushes is virtually at right angles to the path of movement of the blocks. The device is shown in detail in Figure 7, and consists of a shaft 106 carrying a pair of sprockets in spaced relation to each other, one sprocket being designated by the numeral 107 and the other by the numeral 108. Spaced apart from the shaft 106 is a shaft 109, which also carries sprockets 110 and 111 in spaced relation to each other. A chain 112 spans the sprockets 107 and 110, and a second chain 113 spans the sprockets 108 and 111.

Bridge members 114, 115 and 116 are secured to the chains 112 and 113 at right angles to said chains. A brush 117 is secured to the bridging member 114 in angular relation thereto so that the axis of the brush is parallel to the path of movement of the trucks.

The bridge member 115 has a brush 118 secured thereto in the same relation; and likewise bridge member 116 has a brush member 119 secured thereto in the same relation.

The shaft 106 may be driven through suitable gearing connected to the main shaft 48 at a speed relative to the movement of the trucks in the flooring blocks carried thereby as to cause said brushes to traverse the surfaces of the blocks substantially at a right angle to the direction of their movement.

After the blocks leave the zone 101, they may then pass into zones wherein the finished material is dried, and other steps in any desired style of finishing may be applied thereto, but since these steps are no part of the present invention, they need not herein be shown or described.

The applicator and spreading discs 81 and 89 have their lower surfaces coated with material which is suitable for spreading the finish over the surfaces and generally manipulating the finish thereon, and I have tried several materials for this purpose but find that cellulose sponge material is ideal for this purpose, especially in view of the fact that it exerts a fairly uniform pressure on the surface, it spreads the finish evenly thereover and it stands the wear better than many other materials and therefore requires replacement at less frequent intervals.

The lower surface of the disc 96 is preferably covered with a high grade compressed cork which exerts a rubbing action on the surfaces of the blocks, thereby firmly rubbing the finish and finally polishing the surface thereof.

We do not wish to be limited to the specific materials described on the surfaces of the blocks, because it is obvious that many other materials may be used for the purposes described.

By the new and improved method herein described, we are enabled to apply a more deeply seated and longer lasting surface to flooring or the like at a lower cost than heretofore. Many changes may be made by those skilled in the art in the arrangements and steps herein shown and described without departing from the spirit and scope of the invention as set forth in the following claims.

What is claimed is:

1. The process of applying finishes to a surface of a member formed of wood which includes the step of deeply heating that surface of the material to which the finish is to be applied, the step of applying the finish in liquid form to and spreading the same over said heated surface, and the further steps of successively subjecting said material to blasts of air of lower temperature than said material, subjecting said finish to spreading and rubbing actions between each of the points where said material encounters said blasts, said member being constantly moved during all steps of said process.

2. The method of applying finishes to one surface of a member formed of wood which includes the step of subjecting the surface of said material to which the finish is to be applied, to the action of infra-red rays for deeply heating the surface of said material and expanding the air in the pores thereof, the step of applying the finish in liquid form to said surface and spreading the same thereover, and the further steps of successively subjecting said member to blasts of air of lower temperature than the temperature of said member, subjecting said finish to additional spreading and rubbing actions each in an alternate direction between each of the points where said material encounters said blasts of air, said member being constantly moved throughout all said steps.

3. The method of applying finishes to the upper surfaces of members formed of wood wherein said members are carried on continuously moving means, which includes the step of passing said members through a confined area wherein their upper surfaces are subjected to the action of infra-red rays for deeply heating said surfaces and expanding the air in the pores thereof, the step of successively applying the finish in liquid form to said surfaces and spreading the same thereover, and the further steps of subjecting said members to a series of blasts of air at room temperature, and subjecting said finish to additional spreading and rubbing actions in alternate directions between each of the points where a blast of air is encountered.

4. The method of applying finishes to the surfaces of parquette flooring blocks wherein said blocks are continuously moved along a path, which includes the step of passing said blocks through a confined area wherein the surfaces of said blocks are subjected to the action of infra-red rays for deeply heating the surfaces thereof and expanding the air in the pores of said blocks, the step of applying the finish in liquid form to the hot surfaces of said blocks as they leave said area, and the further steps of successively cooling and rubbing the surfaces of said blocks, first in one direction and then in another, thereby evenly distributing said finish over the surfaces and causing the air remaining in said pores to contract and pull said finishing material into the bodies of said blocks.

ARTHUR KLAMMT.
GEO. W. KRETZSCHMAR.